United States Patent [19]

Nagayama

[11] Patent Number: 5,348,432
[45] Date of Patent: Sep. 20, 1994

[54] TEE NUT

[75] Inventor: Yutaka Nagayama, Osaka, Japan

[73] Assignee: Nagayama Electronic Industry Co., Ltd., Wakayama, Japan

[21] Appl. No.: 126,239

[22] Filed: Sep. 24, 1993

[30] Foreign Application Priority Data

May 14, 1993 [JP] Japan .................................. 5-112641

[51] Int. Cl.⁵ ........................ F16B 37/00; F16B 37/04
[52] U.S. Cl. .................................. 411/183; 411/177; 411/282
[58] Field of Search ............... 411/183, 177, 180, 281, 411/282, 427

[56] References Cited

U.S. PATENT DOCUMENTS

| | | | |
|---|---|---|---|
| 2,102,558 | 12/1937 | Johnson | 411/177 |
| 2,286,982 | 6/1942 | Todd | 411/282 |
| 3,480,061 | 11/1969 | Leistner | 411/177 |
| 4,377,275 | 3/1983 | Faber et al. | 411/177 X |

FOREIGN PATENT DOCUMENTS 1157734 7/1969 United Kingdom .

*Primary Examiner*—Neill R. Wilson
*Attorney, Agent, or Firm*—W. G. Fasse; W. F. Fasse

[57] ABSTRACT

In order to prevent a flange of a tee nut which is moved along a feed track from overlapping with that of another tee nut so that the tee nut can be smoothly fed along the feed track, the flange is an octagon having linear sides coupling paired the two pawls of each of two pairs of pawls with each other. To firmly and semi-permanently fix the tee nut in an object, a relatively thin-walled flarable or splayable portion is formed on an end of a shaft away from the flange. A female screw forming portion is provided on a portion of the shaft excluding the flarable or splayable portion. When this tee unit is mounted on the object, the pawls bite into the object and the flarable or splayable portion is flared or splayed to form a flared or splayed rim.

15 Claims, 7 Drawing Sheets

TEE NUT

BACKGROUND OF THE INVENTION

1. Field of the Invention

The present invention relates to a tee nut, and more particularly, it relates to a tee nut comprising a hollow shaft portion which is provided with a female screw on its inner peripheral surface, and a flange portion, outwardly extending from an end of the shaft portion, provided with a plurality of pawls.

2. Description of the Background Art

FIG. 9 is a perspective view showing a conventional tee nut 1, which is of interest to the present invention.

The tee nut 1 comprises a shaft portion 2 and a flange portion 3 outwardly extending from a first end of the shaft portion 2, which are integrally made of a metal material. The shaft portion 2 is in the form of a hollow cylinder, which is provided with a female screw 4 on its inner peripheral surface. The female screw 4 is formed along the overall inner peripheral surface of the shaft portion 2.

On the other hand, the flange portion 3 is provided with two pairs of pawls 5, 6, 7 and 8, which are opposite to each other along a radial direction of the flange portion 3, extending from the first end toward a second end of the shaft portion 2. These pawls 5 to 8 are formed by upwardly bending parts of the outer peripheral edge of the flange portion 3.

Such a tee nut 1 is fixed to an object such as a timber, for example, by inserting the shaft portion 2 in a hole which is previously provided in the object and driving the pawls 5 to 8 into the object. Upon such fixing to the object, the tee nut 1 is inhibited from rotation so that a screw member such as a bolt can be fitted into and engage with the female screw 4 which is formed on the inner peripheral surface of the shaft portion 2.

Such a tee nut 1 is generally called a "hopper feed tee nut", since the tee nut 1 can be smoothly moved along a feed track which is provided on a nut fixer device used for fixing the same to the object, for enabling automatic feeding of successive tee nuts. For example, British Patent No. 1,157,734 describes a type of such a hopper feed tee nut in detail.

FIG. 9 shows the aforementioned feed track 9 in phantom dashed lines. This feed track 9 comprises a pair of guide rails 10 and 11 having C-shaped sections, which are symmetrically arranged to be opposite to each other. The flange portion 3 is slidingly received in these guide rails 10 and 1, so that the tee nut 1 is moved along the feed track 9 in a prescribed orientation while locating the pawls 5 to 8 between the guide rails 10 and 11. The feed track 9 is frequently bent to bring the tee nut 1 into a desired position or orientation although such a bent state is not shown in FIG. 9, so that the shaft portion 2 is aligned with a hole which is provided in the object in which the tee nut is to be installed (not shown).

However, the aforementioned fixing of the tee nut 1 to the object is maintained substantially only by the pawls 5 to 8 biting into the object. The pawls 5 to 8 thus biting into the object may become so loosened over time that the tee nut 1 becomes unfixed or falls out of the object in the worst case. FIGS. 10 and 11 show another conventional tee nut 12, which has been proposed in order to solve such a problem. FIGS. 10 and 11 are a front elevational view and a bottom plan view showing the tee nut 12 respectively.

This tee nut 12 comprises a shaft portion 13 and a flange portion 14 outwardly extending from a first end of the shaft portion 13, which are integrally made of a metal material, similarly to the aforementioned tee nut 1. The shaft portion 13 is in the form of a hollow cylinder and has a flarable or splayable portion 15 in a second end which is opposite to the aforementioned first end, while a female screw 16 is formed on an inner peripheral surface portion excluding the flarable or splayable portion 15. The flarable or splayable portion 15 has a relatively small thickness to facilitate later flaring or splaying the portion 15 as described below.

On the other hand, the flange portion 14 is provided with two pairs of pawls 17, 18, 19 and 20, which are opposite to each other along a radial direction of the flange portion 14, and extend from the first end toward the second end of the shaft portion 13. These pawls 17 to 20 are formed by upwardly bending parts of the outer peripheral edge of the flange portion 14.

Such a tee nut 12 is used in the manner shown in FIG. 12, for example. Referring to FIG. 12, an object 21 such as a timber, for example, is previously provided with a through hole 22. The shaft portion 13 of the tee nut 12 is inserted in this through hole 22. In this state, the flarable or splayable portion 15 shown in FIG. 10 is splayed or flared by a flaring tool, so that a splayed or flared rim 15a is formed on one surface of the object 21. At the same time, the pawls 17 to 20 are driven into the other surface of the object 21. Thus, the tee nut 12 is completely fixed to the object 21.

In such a mounting state of the tee nut 12, the pawls 17 to 20 inhibit the tee nut 12 from rotation with respect to the object 21, while the flange portion 14 and the splayed or flared rim 15a hold the object 21 in an axial direction to inhibit disengagement of the tee nut 12 from the through hole 22. Thus, the tee nut 12 is strongly fixed to the object 21, and such a fixed state is semipermanently maintained.

This tee nut 12 is also applied as a "hopper feed tee nut", similarly to the aforementioned tee nut 1. Therefore, the tee nut 12 is also moved along the feed track 9 shown in FIG. 9. When a plurality of such tee nuts 12 are moved along the feed track 9, however, the movement is frequently hindered in a manner described as follows.

The flange portion 14 of the tee nut 12 is substantially in the form of a circle before formation of the pawls 17 to 20. Therefore, the pair of pawls 17 and 18 and the other pair of pawls 19 and 20 are coupled with each other by arcuate sides 23 and 24 respectively. When a plurality of tee nuts 12 are serially moved along the feed track 9 (see FIG. 9), therefore, the flange portions 14 tend to overlap with those of adjacent tee nuts 12. Consequently, the tee nuts 12 are frequently erroneously fed along the feed track 9 or therein.

On the other hand, the flange portion 3 of the tee nut 1 shown in FIG. 9 is in the form of an octagon as a whole, and the paired ones of the two pairs of pawls 5, 6, 7 and 8 are coupled with each other by linear sides 25 and 26 respectively. The linear side edges of flange portion 3 hold the tee nut in a prescribed orientation and prevent overlapping of adjacent tee nuts in feed track 9. When a plurality of such tee nuts 1 are fed along the feed track 9, therefore, the flange portions 3 relatively rarely cause the aforementioned overlapping phenomenon.

Thus, it is expected that it is possible to reduce the aforementioned overlapping phenomenon in the tee nut 12 shown in FIGS. 10 and 11 by changing the shapes of the arcuate sides 23 and 24 of the flange portion 14 to be linear side edges. However, the arcuate shapes cannot be so easily changed as hereinafter described, and in practice, it is impossible to find such a modified tee nut in the market.

In general, the tee nut 12 is obtained by drawing a strip-shaped metal plate. Such a strip-shaped metal plate is fed along a progressive die to be worked in a prescribed order, so that an intermediate product is separated from the strip-shaped metal plate in a stage subjected to working for obtaining some of the features of the tee nut 12. This intermediate product has portions corresponding to the shaft portion 13 and the substantially circular flange portion 14, with slits for forming the pawls 17 to 20. The intermediate product is then grasped by a tool chuck on the portion corresponding to the flange portion 14, so that the flarable or splayable portion 15 and the female screw 16 are formed in the portion corresponding to the shaft portion 13 in this state. The flarable or splayable portion 15 is formed by cutting the inner peripheral surface of the shaft portion 13 with a cutting tool for reducing the wall thickness. Thereafter the pawls 17 to 20 are bent or raised up from the flange portion 14, to obtain the desired tee nut 12.

The flange portion 14 is substantially in the form of a circle before formation of the pawls 17 to 20 as hereinabove described, in relation to the grasping of the intermediate product by a chuck for forming the flarable or splayable portion 15. If the flange portion 14 to be grasped by the chuck has a substantially circular shape, it is possible to grasp the flange portion 14 in the chuck while properly centering the shaft portion 13 for the machining operation since the flange portion 14 has no directivity with respect to such chucking. In this case, further, the flange portion 14 has no corner on in its outer peripheral portion, whereby no flash is caused by the chuck grasping the flange portion 14 since no outer peripheral part of the flange portion 14 is crushed by the chuck.

On the other hand, it is difficult to grasp in a chuck the flange portion 3 having a substantially octagonal shape as shown in FIG. 9, due to its directivity, while it is also difficult to center the shaft portion 2. When the flange portion 3 is grasped in a chuck, further, corners of the flange portion 3 may be compressively deformed to result in flashes. Such flashes inhibit the tee nut 1 from moving smoothly along the feed track 9. While a chuck having a specific structure may be employed in order to solve the aforementioned problem, it is necessary to regularly set the flange portion 3 along a constant direction with a specific orientation, through a complicated operation when using such a chuck.

In the tee nut 12 having the flarable or splayable portion 15 as shown in FIGS. 10 and 11, therefore, the flange portion 14 must be substantially in the form of a circle in a stage before formation of the pawls 17 to 20.

SUMMARY OF THE INVENTION

Accordingly, an object of the present invention is to provide, in relation to a tee nut comprising a flarable or splayable portion, a structure which can prevent a flange portion from overlapping with that of another tee nut during movement along a feed track.

The present invention is directed to a tee nut which comprises a shaft portion and a flange portion outwardly extending from a first end of the shaft portion, which are integrally made of a metal material. The shaft portion is in the form of a hollow cylinder and has a relatively thin flarable or splayable portion on a second end which is opposite to the first end, while a female screw is formed on an inner peripheral surface portion excluding the flarable or splayable portion. Two pairs of pawls are arranged on an outer peripheral portion of the flange portion in opposite positions along a radial direction of the flange portion, to extend from the first end toward the second end. A peripheral edge of the flange portion has such a shape that paired ones of the two pairs of pawls are coupled with each other by linear sides respectively.

As hereinabove described, the tee nut according to the present invention is provided with a relatively thin flarable or splayable portion in its shaft portion, while the flange portion comprises linear sides. In order to obtain such a structure, it is necessary to solve the aforementioned problem resulting from a chuck grasping the flange portion. This problem can be solved in the following manner, for example. When the tee nut according to the present invention is manufactured, the relatively thin flarable or splayable portion is formed by forging, for example, an intermediate product for the tee nut which is not yet separated from a strip-shaped metal plate. Thus, it is not necessary to grasp each intermediate product in a chuck for cutting the same with a cutting tool in this state for forming the flarable or splayable portion. The present invention is not directed to a method of manufacturing a tee nut. Therefore, the method of manufacturing the tee not is not restricted to the described method.

When a plurality of tee nuts according to the present invention are serially moved along a feed track, respective flange portions of adjacent tee nuts are in contact with each other along linear sides coupling paired ones of the pawls. Therefore, the flange portions generally do not overlap with those adjacent thereto.

When the tee nut according to the present invention is fixed to an object, the pawls bite into the object to inhibit the tee nut from rotation with respect to the object. The flarable or splayable portion is so flared or splayed to form a flared or splayed rim. The flared or splayed rim and the flange portion hold the object in an axial direction to inhibit the tee nut from falling out or coming off from the object.

According to the present invention, therefore, it is possible to prevent the flange portions from overlapping with those adjacent thereto when a plurality of tee nuts are moved along a feed track, thereby smoothly moving the plurality of tee nuts along the feed track.

At the same time, the tee nut according to the present invention comprises a flarable or splayable portion which also has a flange portion which is provided with linear sides.

With this construction, the tee nut can be firmly mounted on an object, and it is possible to maintain the tee nut in a securely fixed state even if the object undergoes a dimensional change with time such as contraction caused in a timber due to drying, for example.

When the pawls of the tee nut according to the present invention are indented, notched or barbed or in the form of hooks, it is possible to further securely fix the tee nut to the object.

The tee nut according to the present invention may be further provided with protrusions, projecting in the same direction as the pawls The protrusions are provided opposite one another along a radial direction which is perpendicular to that on which the two pairs of pawls are arranged opposite one another. When the tee nut is moved along a feed track, these protrusions are located in a pair of guide rails which are provided in the feed track. Thus, clearances of the guide rails relative to the flange portion are substantially blocked or filled with such protrusions, whereby the flange portion is prevented from upward movement in the guide rails. This also prevents the flange portion from overlapping with the flange portion of the tee nut adjacent thereto. The protrusions also contribute to smooth movement of the tee nut along the feed track in another mode as follows. Formation of the pawls in the flange portion often results in flashes or burr edges which project in the same direction as the pawls. Such flashes inhibit the tee nut from smooth movement along the feed track. Therefore, the flashes are generally removed by barrel polishing. However, it is relatively difficult to completely remove the flashes. Even if the flashes are incompletely removed or not removed at all, it is possible to allow the aforementioned protrusions to project outwardly beyond the flashes, thereby preventing the flashes from inhibiting the movement of the tee nut along the feed track.

According to the present invention, the thread of the female screw may be partially irregularized, for example, by a smaller inner diameter or a greater protrusion or an altered pitch of the screw threads of the irregularized portion. In this case, a male screw threading of a bolt fitted into the female screw threading requires relatively large force to pass through the irregularized part of the female screw threading, while this means that a large force is also required when the male of thread bolt is to be removed from the female screw threading. Once the bolt is fitted into the female screw of the tee nut, therefore, the irregularized part of the female screw is adapted to lock the male threaded bolt in a fitted state.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS AND OF THE BEST MODE OF THE INVENTION

Figure 1:
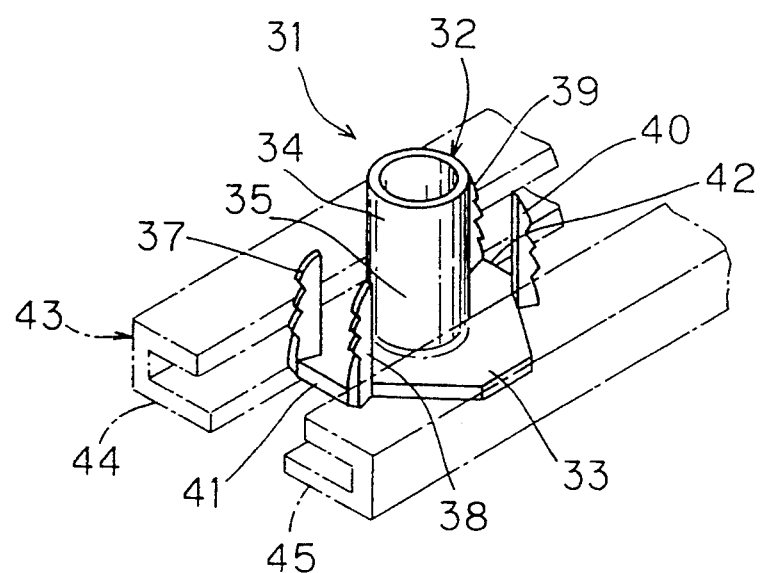
FIG. 1 is a perspective view showing a tee nut 31 according to a first embodiment of the present invention.
Figure 2:
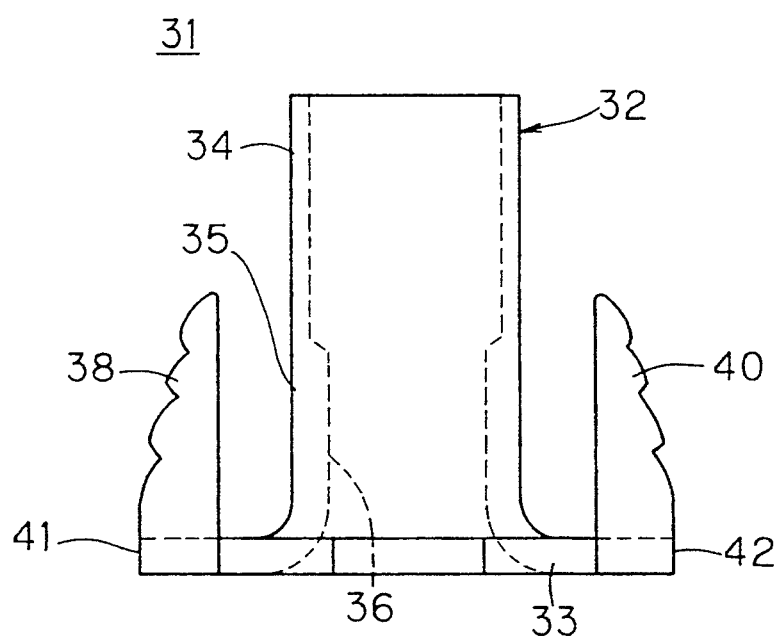
FIG. 2 is a front elevational view of the tee nut 31 shown in FIG. 1.
Figure 3:
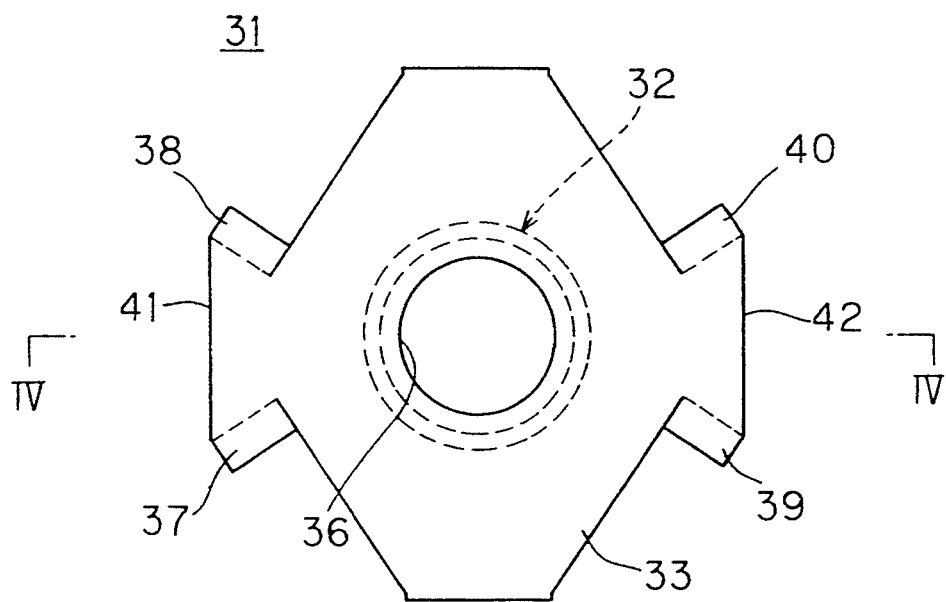
FIG. 3 ms a bottom plan view of the tee nut 31 shown in FIG. 1.
Figure 4:
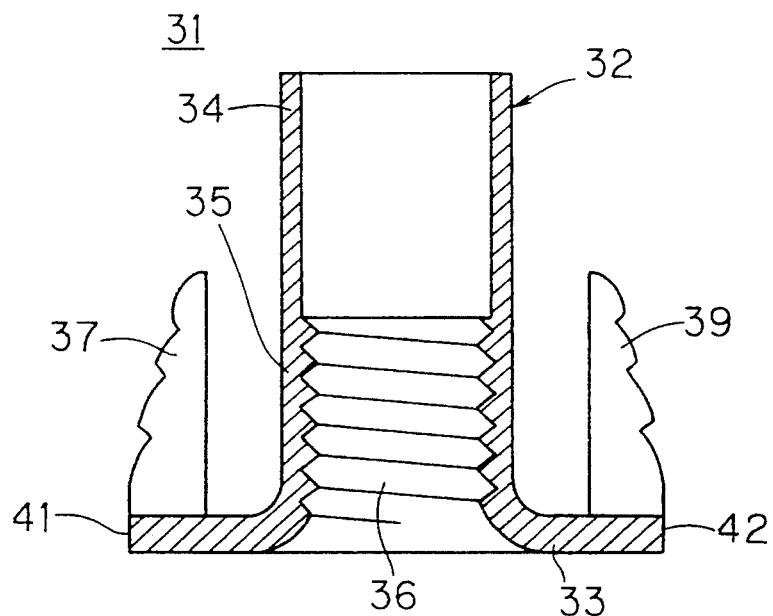
FIG. 4 is a sectional view taken along the line IV—IV in FIG. 3.

FIGS. 1 to 4 show a tee nut 31 according to a first embodiment of the present invention. FIG. 1 is a perspective view of the tee nut 31. FIG. 2 is a front elevational view of the tee nut 31. FIG. 3 is a bottom plan view of the tee nut 31. FIG. 4 is a sectional view taken along the line IV—IV in FIG. 3.

The tee nut 31, which is integrally formed by drawing a ferrous metal plate, for example, comprises a shaft 32 and a flange 33 outwardly extending from a first end of the shaft 32.

Figure 10:
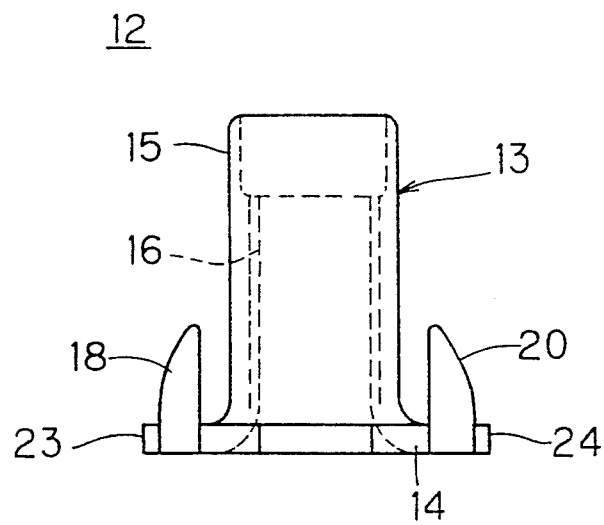
FIG. 10 is a front elevational view showing another conventional tee nut 12, which is of interest to the present invention.
Figure 11:
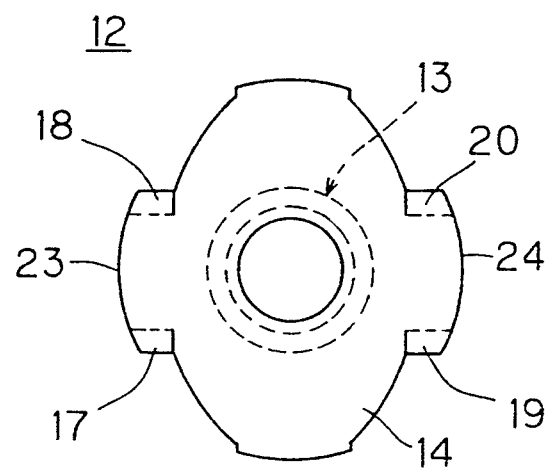
FIG. 11 is a bottom plan view of the tee nut 12 shown in FIG. 10.

The shaft 32 is in the form of a hollow cylinder similarly to the conventional tee nut 12 shown in FIGS. 10 and 11, and provided with a thinner walled flarable or splayable portion 34 at a second end which is opposite to the first end. The shaft 32 includes the flarable portion 34 and a female screw forming portion 35. A female screw threading 36 is formed on an inner peripheral surface of female screw forming portion 35. The flarable portion 34 has a smaller wall thickness than the female screw forming portion 35. Thus, thread cutting for forming the female screw threading 36 can be started from either the first or second end of the shaft portion 32.

Figure 9:
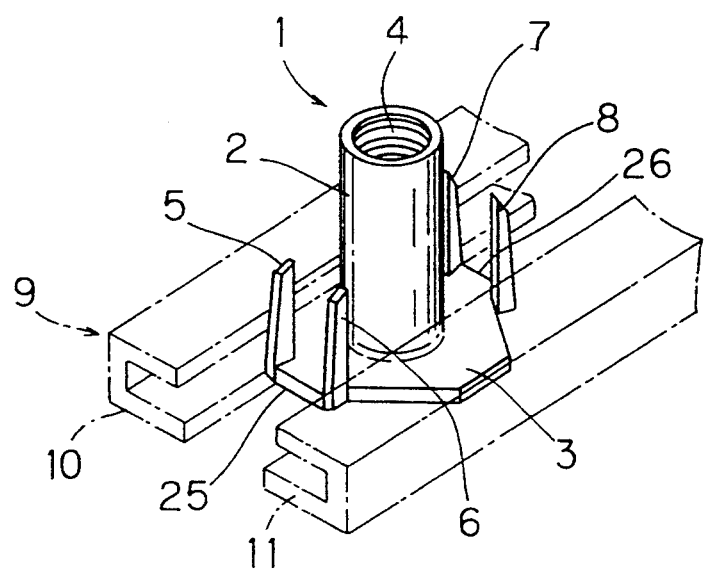
FIG. 9 is a perspective view showing a conventional tee nut 1, which is of interest to the present invention.

Similarly to the conventional tee nut 1 shown in FIG. 9, two pairs of pawls 37, 38, 39 and 40, extending from the first end toward the second end of the shaft 32, are arranged on an outer periphery of the flange 33 whereby the pairs are opposite to each other along a radial direction of the flange 33. These pawls 37 to 40 are formed by upwardly bending parts of the outer peripheral edge of the flange 33. The pawls 37 to 40 are indented or notched respectively.

The flange 33 is substantially in the form of an octagon as a whole, similarly to the flange portion 3 shown in FIG. 9. In particular, the pair of pawls 37 and 38 and the other pair of pawls 39 and 40 are coupled with each other through linear sides 41 and 42 respectively.

FIG. 1 shows with dashed phantom lines a feed track 43 for serially feeding a plurality of tee nuts 31. This feed track 43 comprises a pair of symmetrically arranged guide rails 44 and 45 having C-shaped sections, similarly to the feed track 9 shown in FIG. 9. The flanges 33 are received in the respective guide rails 44 and 45, between which the pawls 37 to 40 are located, so that the tee nuts 31 are moved along the feed track 43. At this time, the linear side 41 or 42 of the flange 33 of each tee nut 31 faces the linear side 41 or 42 of the flange 33 of the adjacent tee nut 31. Thus, the flanges 33 are prevented from overlapping with the adjacent flanges 33.

Figure 12:
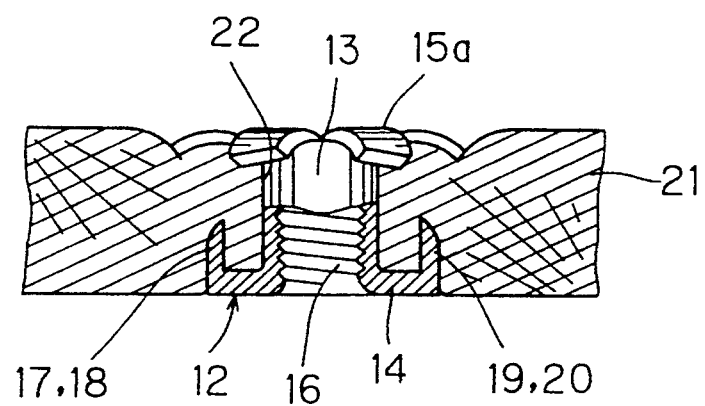
FIG. 12 is a sectional view showing the installed condition of the tee nut 12 shown in FIG. 10.

Each tee nut 31 is to be fixed to an object in the aforementioned manner as shown in FIG. 12. Namely, the shaft 32 is inserted in a through hole 22 which has been previously formed in the object, so that the flarable portion 34 is flared or splayed to form a flared or splayed rim on the side of the object opposite the flange 33, while pawls 37 to 40 bite into the object in this state. Thus, the tee nut 31 is firmly and semipermanently fixed to the object.

Figure 5:
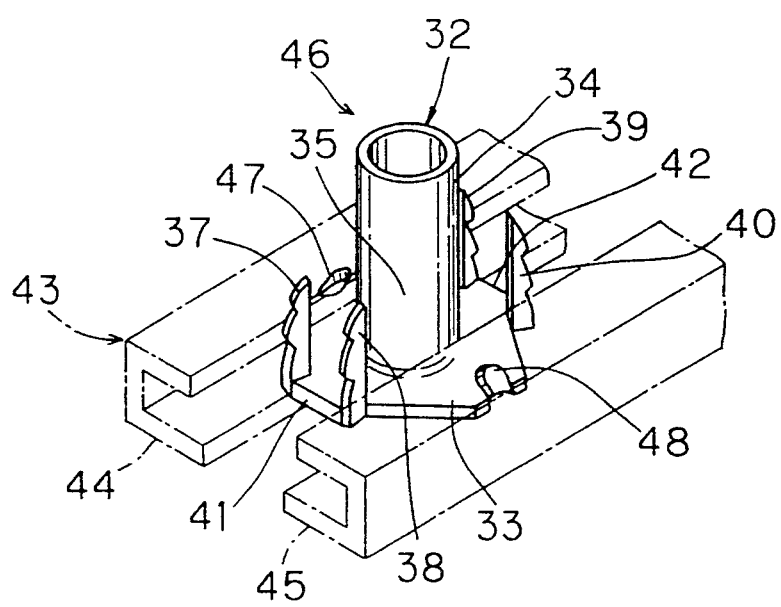
FIG. 5 is a perspective view showing a tee nut 46 according to a second embodiment of the present invention.

FIG. 5 is a perspective view corresponding to that of FIG. 1, but showing a tee nut 46 according to a second embodiment of the present invention. This tee nut 46 includes a number of elements which are common to those of the aforementioned tee nut 31, and are denoted by similar reference numerals, to omit redundant description.

Protrusions 47 and 48 are provided on a peripheral edge of the tee nut 46 in opposite positions along a radial direction which is perpendicular to that on which the two pairs of pawls 37, 38, 39 and 40 respectively are arranged opposite one another. These protrusions 47 and 48 project toward a second end of a shaft 32, similarly to the pawls 37 to 40. Such protrusions 47 and 48 are formed by inwardly crushing or bending parts of the outer peripheral edge of a flange 33 from the exterior. Consequently, notches having substantially semicircular sections are left in the outer peripheral edge of the flange 33.

FIG. 5 shows a feed track 43 in dashed phantom lines. When the flange 33 is received in respective ones of guide rails 44 and 45 which are provided in the feed track 43, the protrusions 47 and 48 are located in the guide rails 44 and 45 respectively. In this arrangement, it is possible to substantially block any clearances between the flange 33 and the guide rails 44 and 45 with the protrusions 47 and 48.

Therefore, the flange 33 of the tee nut 46 is prevented from upward movement in the guide rails 44 and 45, and this also prevents the flange 33 from overlapping with a flange 33 of an adjacent tee nut 46. Even if the protrusions 47 and 48 are in contact with the guide rails 44 and 45, it is possible to substantially reduce frictional resistance therebetween when the protrusions 47 and 48 have pointed forward ends. This also contributes to smooth movement of the tee nut 46 along the feed track 43.

Formation of the protrusions 47 and 48 is not restricted to the aforementioned method, but the protrusions 47 and 48 may alternatively be formed by bending parts of the peripheral edge of the flange 33 or pressing parts of the flange 33 in a direction perpendicular to its surface direction.

Other features of the tee nut 46 shown in FIG. 5 differ from the tee nut 31 shown in FIG. 1, in addition to the provision of the protrusions 47 and 48. First, the shaft 32 of the tee nut 46 is longer than that of the tee nut 31. This means that the length of the shaft 32 can be changed in various ways as desired. Second, the indented shapes or notches of the pawls 37 to 40 of the tee nut 46 are slightly different from those of the tee nut 31. This means that the indented shapes or notches of the pawls 37 to 40 can be also changed in various ways.

Figure 6:
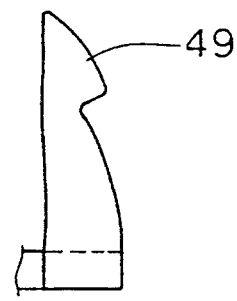
FIG. 6 is a front elevational view showing a pawl 49 of a tee nut according to a third embodiment of the present invention.
Figure 7:
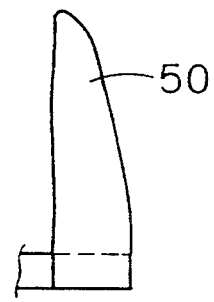
FIG. 7 is a front elevational view showing a pawl 50 of a tee nut according to a fourth embodiment of the present invention.

FIGS. 6 and 7, each corresponding to a part of FIG. 2, show third and fourth embodiments of the present invention. These figures show modifications of pawls respectively.

A pawl 49 shown in FIG. 6 is in the form of a hook or barbed point. On the other hand, a pawl 50 shown in FIG. 7 is neither indented nor hook-shaped, but has a straight shape. Thus, the shapes of the pawls are not particularly restricted in the tee nut according to the present invention.

Figure 8:
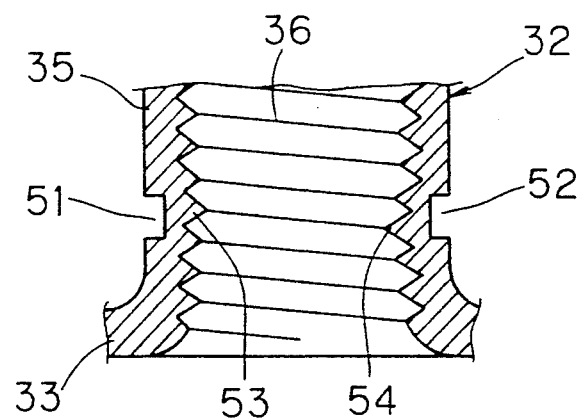
FIG. 8 is a sectional view showing a female screw forming portion 35 of a shaft portion 32 of a tee nut according to a fifth embodiment of the present invention.

FIG. 8 shows a fifth embodiment of the present invention, in correspondence to a part of FIG. 4. Referring to FIG. 8, elements corresponding to those shown in FIG. 4 are denoted by similar reference numerals, to omit redundant description.

Parts of an outer peripheral surface of a female screw forming portion 35, which is provided on a shaft 32, are inwardly crushed or indented so as to form two concave indentations 51 and 52 with an angular space of 180°, for example. Such concave indentations 51 and 52 are formed by holding prescribed parts of the female screw forming portion 35 with a pair of proper tools and strongly pressing these tools against the female screw forming portion 35. The concave indentations 51 and 52 are preferably formed in positions which are close to a flange 33. If the pair of indenting tools are applied at positions far from the flange 33, the concave indentations 51 and 52 are hardly formed but instead the section of the shaft 32 is easily flatly deformed. Further, the concave indentations 51 and 52 are preferably formed at a stage before formation of pawls 37 to 40 (FIG. 1) in the flange 33, so that such pawls 37 to 40 will not hinder formation of the concave indentations 51 and 52 in the vicinity of the flange 33.

Although the tee nut according to this embodiment is provided with two concave indentations 51 and 52, the number of such concave indentations is not restricted to two. The inventive tee nut may alternatively be provided with only one, or three or more concave indentations 51 and 52, for example.

Upon formation of the concave indentations 51 and 52, the female screw threading 36 is partially irregularized, for example, by having a reduced inner clearance diameter or an out-of-round shape or a varied pitch at the locations of the indentations 51 and 52. Thus, a bolt (not shown) which is fitted into the female screw threading 36 cannot pass through such irregularized portions 53 and 54 unless the bolt is relatively strongly rotated. At this time, the thread may be partially crushed in the irregularized portions. Consequently, the bolt is locked in the state fitted into the female screw threading 36, and is prevented from disengaging from the tee nut.

While the present invention has been described with reference to the embodiments shown in the drawings, the flange is not restricted to an octagonal shape but may have another shape so far as the pairs of pawls are coupled with each other by linear sides.

Although the present invention has been described and illustrated in detail, it is clearly understood that the same is by way of illustration and example only and is not to be taken by way of limitation, the scope of the present invention being limited only by the terms of the appended claims.

What is claimed is:

1. A tee nut being made of an integral metal material and comprising a shaft and a flange outwardly extending from a first end of said shaft and comprising an outer peripheral edge, said shaft being in the form of a hollow cylinder and having a relatively thin-walled flarable portion at a second end being opposite to said first end, and a relatively thicker-walled threaded portion at said first end having a female screw threading formed on an inner surface of said threaded portion, said screw threading not extending into said flarable portion, two pairs of pawls being arranged on said outer peripheral edge of said flange in opposite positions along a radial direction of said flange, wherein each of said pawls extends substantially from said first end toward said second end, said outer peripheral edge of said flange having such a shape that the pawls of each pair of said two pairs of pawls are coupled with each other by a respective linear edge of said outer peripheral edge.

2. The tee nut in accordance with claim 1, wherein said flange is substantially in the form of an octagon.

3. The tee nut in accordance with claim 1, wherein said pawls comprise edges selected from the group consisting of indented edges, notched edges, serrated edges and barbed edges.

4. The tee nut in accordance with claim 1, wherein said pawls comprise hooks.

5. The tee nut in accordance with claim 1, further comprising protrusions formed on said outer peripheral edge of said flange, said protrusions projecting toward said second end and arranged at opposite positions along a direction perpendicular to said radial direction along which said pairs of pawls are arranged.

6. The tee nut in accordance with claim 1, wherein said outer peripheral edge consists entirely of linear edges.

7. The tee nut in accordance with claim 1, wherein said flarable portion can be flared to form a flared rim extending radially outwardly at said second end of said shaft.

8. The tee nut in accordance with claim 1, wherein said flarable portion has been flared to form a flared rim extending radially outwardly at said second end of said shaft.

9. The tee nut in accordance with claim 1, wherein said flarable portion can be splayed to form a plurality of splayed rim sections extending radially outwardly at said second end of said shaft.

10. The tee nut in accordance with claim 1, wherein said flarable portion has been splayed to form a plurality of splayed rim sections extending radially outwardly at said second end of said shaft.

11. The tee nut in accordance with claim 1, wherein said shaft has a substantially uniform outer diameter along its entire length and wherein said flarable portion has a larger inner diameter than an inner diameter of said threaded portion.

12. The tee nut in accordance with claim 1, wherein said female screw threading comprises an irregularized thread portion having an irregularity selected from the group consisting of a reduced inner thread diameter, a varied thread pitch and an out-of-round shape.

13. The tee nut in accordance with claim 12, wherein said irregularized thread portion is arranged at said first end, proximately to said flange.

14. The tee nut in accordance with claim 12, wherein said irregularized thread portion has a reduced inner thread diameter relative to the remainder of said female screw threading.

15. The tee nut in accordance with claim 7, wherein said irregularized thread portion further has an out-of-round shape.

* * * * *

UNITED STATES PATENT AND TRADEMARK OFFICE
CERTIFICATE OF CORRECTION

PATENT NO. : 5,348,432
DATED : Sep. 20, 1994
INVENTOR(S) : Yutaka Nagayama It is certified that error appears in the above-identified patent and that said Letters Patent is hereby corrected as shown below:

On the title page, [57] Abstract, line 5, delete "paired";
Column 2, line 57, before "therein" insert --clogged--;
Column 4, line 68, after "pawls" insert --.--;
Column 5, line 34, delete "of";
Column 5, line 35, replace "thread" by --threaded--;
Column 5, line 52, replace "ms" by --is--;
Column 6, line 51, after "shows" insert --,--; after "lines" insert --,--;
Column 7, line 2, after "while" insert --the--;
Column 7, line 25, delete "ones of";
Column 10, line 28, replace "7" by --14--.

Signed and Sealed this

Twenty-second Day of November, 1994

*Attest:*

BRUCE LEHMAN

*Attesting Officer*     *Commissioner of Patents and Trademarks*

(12) REEXAMINATION CERTIFICATE (4248th)
United States Patent
Nagayama

(10) Number: US 5,348,432 C1
(45) Certificate Issued: Jan. 9, 2001

(54) TEE NUT

(75) Inventor: Yutaka Nagayama, Osaka (JP)

(73) Assignee: Nagayama Electronic Industry Co., Ltd., Wakayama (JP)

Reexamination Request:
No. 90/005,465, Aug. 26, 1999

Reexamination Certificate for:
Patent No.: 5,348,432
Issued: Sep. 20, 1994
Appl. No.: 08/126,239
Filed: Sep. 24, 1993

Certificate of Correction issued Nov. 22, 1994.

(30) Foreign Application Priority Data

May 14, 1993 (JP) .................................................. 5-112641

(51) Int. Cl.⁷ .............................. F16B 37/00; F16B 37/04
(52) U.S. Cl. ............................ 411/183; 411/177; 411/282
(58) Field of Search .................................. 411/176, 177, 411/180, 181, 183, 281, 282, 283, 427

(56) References Cited

U.S. PATENT DOCUMENTS

| | | |
|---|---|---|
| 3,365,998 | 1/1968 | Zahodiakin . |
| 4,508,478 | 4/1985 | Leistner . |
| 4,828,441 | 5/1989 | Frasca . |
| 5,195,854 | 3/1993 | Nagayama . |

OTHER PUBLICATIONS

Catalog p. 17 dated Aug. 1988 from Stafast Products, Inc.
Catalog p. 21 dated Aug. 1988 from Stafast Products, Inc.
An advertising sheet titled "TOP–NUT" by Maure–e–Saveron attached to a call report dated Oct. 20, 1992 from James H. Grimes Co., Inc.
A copy of a blueprint of Sigma Tool & Machine Ltd. dated Oct. 28, 1992.

*Primary Examiner*—Neill Wilson

(57) ABSTRACT

In order to prevent a flange of a tee nut which is moved along a feed track from overlapping with that of another tee nut so that the tee nut can be smoothly fed along the feed track, the flange is an octagon having linear sides coupling the two pawls of each of two pairs of pawls with each other. To firmly and semipermanently fix the tee nut in an object, a relatively thin-walled flarable or splayable portion is formed on an end of a shaft away from the flange. A female screw forming portion is provided on a portion of the shaft excluding the flarable or splayable portion. When this tee unit is mounted on the object, the pawls bite into the object and the flarable or splayable portion is flared or splayed to form a flared or splayed rim.

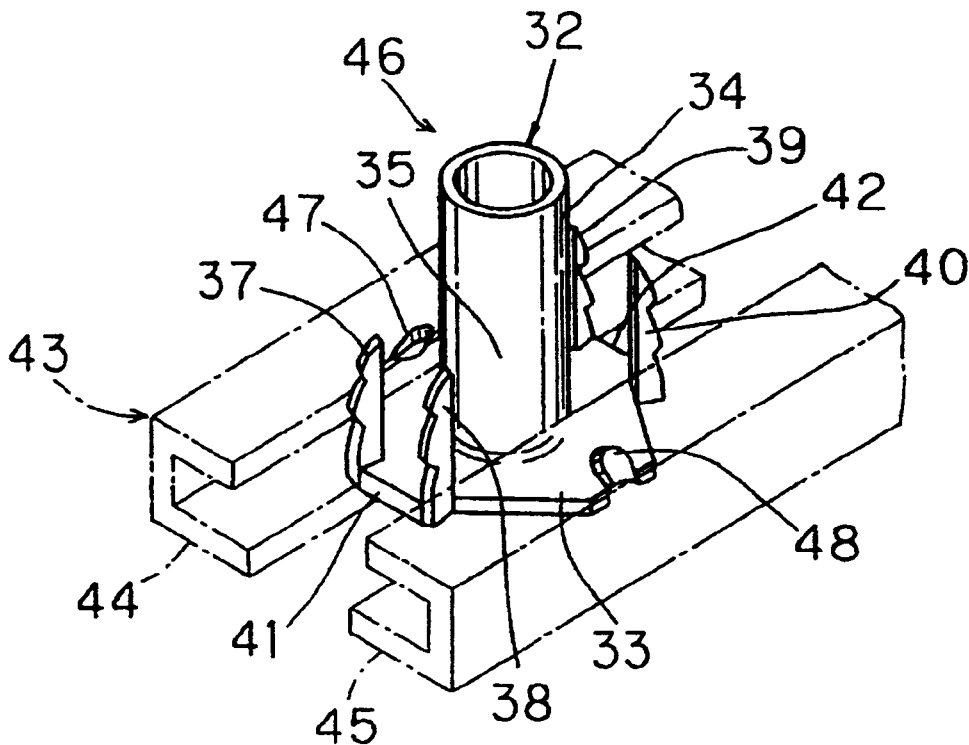

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 6, lines 46–50:

The flange 33 is substantially in the form of an octagon as a whole, similarly to the flange portion 3 shown in FIG. 9. In particular, the pair of pawls 37 and 38 and the other pair of pawls 39 and 40 are coupled with each other through *first* linear sides 41 and 42 respectively. *Further second, third and fourth linear sides respectively bound the perimeter of two flat portions of the flange 33 that extend on opposite sides of the shaft between the two pairs of pawls.*

Column 7, lines 12–23:

Protrusions 47 and 48 are provided on a peripheral edge of the tee nut 46 in opposite positions along a radial direction which is perpendicular to that on which the two pairs of pawls 37, 38, 39 and 40 respectively are arranged opposite one another[. These], *in contrast to the tee nut 31 of FIG. 1, which does not have such protrusions and instead has the flange 33 lying in one flat plane. In the embodiment of FIG. 5, these* protrusions 47 and 48 project toward a second end of a shaft 32, similarly to the pawls 37 to 40. Such protrusions 47 and 48 are formed by inwardly crushing or bending parts of the outer peripheral edge of a flange 33 from the exterior. Consequently, notches having substantially semicircular sections are left in the outer peripheral edge of the flange 33.

AS A RESULT OF REEXAMINATION, IT HAS BEEN DETERMINED THAT:

The patentability of claims 1–15 is confirmed.

New claims 16–18 are added and determined to be patentable.

16. The tee nut in accordance with claim 1, not including any protrusions, in addition to said pawls, formed on said outer peripheral edge of said flange.

17. The tee nut in accordance with claim 1, wherein said thin-walled flarable portion of said shaft was formed by forging and has material properties that are characteristic of having been formed by forging.

18. A tee nut being made of an integral metal material and comprising:
   a shaft and
   a flange outwardly extending from a first end of said shaft and comprising an outer peripheral edge,
   said shaft being in the form of a hollow cylinder and having a relatively thin-walled flarable portion at a second end being opposite to said first end, and a relatively thicker-walled threaded portion at said first end having a female screw threading formed on an inner surface of said threaded portion, said screw threading not extending into said flarable portion,
   two pairs of pawls formed by cutting and raising portions of said outer peripheral edge of said flange and being arranged on said outer peripheral edge of said flange in opposite positions along a first radial direction of said flange,
   wherein each of said pawls extends substantially from said first end toward said second end,
   wherein said outer peripheral edge of said flange has a shape substantially in the form of an octagon bounded by a perimeter including the first linear edges, two second linear edges, two third linear edges, and two fourth linear edges,
   wherein two pawls of each pair of said two pairs of pawls are coupled with each other by a respective one of said first linear edges,
   wherein said flange includes two flat portions extending on opposite sides of said shaft in a second radial direction that crosses said first radial direction, and
   wherein said flat portions are each respectively bounded by respective ones of said second linear edges, said third linear edges and said fourth linear edges.

* * * * *